US006875164B1

(12) United States Patent
Lebold et al.

(10) Patent No.: US 6,875,164 B1
(45) Date of Patent: Apr. 5, 2005

(54) HIGH CAPACITY LEAK RESISTANT RELEASE AGENT DELIVERY SYSTEM FOR USE IN PRINTER DEVICES

(75) Inventors: Alan Lebold, Niagara Falls, NY (US); Peter A. Milicia, Youngstown, NY (US); Patrick M. Whitehead, Youngstown, NY (US); Carl E. Doell, Darien, NY (US)

(73) Assignee: BMP America, Inc., Medina, NY (US)

( * ) Notice: Subject to any disclaimer, the term of this patent is extended or adjusted under 35 U.S.C. 154(b) by 0 days.

(21) Appl. No.: 10/687,751

(22) Filed: Oct. 20, 2003

(51) Int. Cl.[7] .............................. F16C 13/00; B21K 1/02

(52) U.S. Cl. .............................. 492/56; 492/50; 492/51; 492/44; 29/895.211; 399/326

(58) Field of Search .............................. 492/56, 50, 51, 492/44; 29/895.211; 399/325, 324, 326, 327; 118/60

(56) References Cited

U.S. PATENT DOCUMENTS

| | | | | |
|---|---|---|---|---|
| 5,327,203 A | * | 7/1994 | Rasch et al. | 399/326 |
| 6,449,455 B1 | | 9/2002 | Lebold et al. | |
| 6,609,645 B1 | * | 8/2003 | Groel et al. | 226/190 |

OTHER PUBLICATIONS

Freudenberg Evolon Brochure.

* cited by examiner

*Primary Examiner*—Marc Jimenez
(74) *Attorney, Agent, or Firm*—Jones Tullar & Cooper, PC

(57) ABSTRACT

A toner release agent delivery system for a printing device utilizes a roller which has a plurality of layers of a non-woven textile web. The textile web is comprised of substantially all sub-denier fibers. The release agent delivery system with predominately sub-denier fibers has a very high release agent retention capability with a very low leak rate.

12 Claims, 6 Drawing Sheets

HIGH CAPACITY LEAK RESISTANT RELEASE AGENT DELIVERY SYSTEM FOR USE IN PRINTER DEVICES

FIELD OF THE INVENTION

The present invention is directed generally to a release agent delivery system for use in a printing process. More particularly, the present invention is directed to a non-woven textile fabric web roller for use as a release agent delivery device in a release agent delivery system. Most specifically, the present invention is directed to a non-woven textile fabric web roller of essentially sub-denier fibers for use in a release agent delivery system. The use of a textile web of sub-denier fibers in a roller construction provides a release agent delivery system with the provision of very high oil holding capacity through the provision of increased textile capillary force which is a result of the textile web's inherent high surface area to volume ratio.

BACKGROUND OF THE INVENTION

In printing processes such as Phase Change ink printing ("PC") and Electrostatic toner Printing ("EP") there typically exists a point in the process where pressure is applied to marking or printing substances, thereby pressing those marking or printing substances onto a substrate, which marking or printing substances then form a visual image. The marking substance in PC is typically a wax-based ink while the marking substance in EP is typically toner particles. The substrate in both PC and EP is typically paper. The pressure is typically formed between the "nip" of two rollers.

The permanent fixing or "fusing" of the marking or printing substances onto the substrate includes a warming process of the marking substances prior to, or upon their reaching the nip point. The warming process allows the wax or toner to become flowable and tacky. When the warmed marking or printing substances and the substrate reach the nip point, the nip pressure causes the wax or toner to flow into the fibers or pores of the paper. When the wax or toner cools, solidification of the wax or toner occurs thus causing the wax or toner to be bonded firmly to the paper.

The methods of thermally fusing wax or toner onto the paper inherently include some drawbacks. One such drawback of these fuser systems is that since the wax or toner particles are tackified by heat, part of the heated wax or toner particles forming the image are often inadvertently retained by the fuser roller rather than penetrating the paper's surface. This tackified wax or toner often sticks to the surface of the fuser roller and then gets deposited onto the following paper or onto the mating pressure roller. This unintended depositing of wax or toner onto the following paper is known as "offsetting". Offsetting is an undesirable occurrence, which lowers the sharpness and quality of the immediate print and also contaminates the following prints with offset wax or toner.

To alleviate the wax or toner-offsetting problem, it is common practice to utilize release agents such as silicone oils, which are applied to the fuser roll surface and which act as wax or toner release agents. These wax or toner release agents possess a relatively low surface energy and are suitable for use in the fuser roll environment. In practice, a thin layer of silicone oil is applied to the surface of the fuser roll to form an interface between the fuser roll surface and the wax or toner particles. Thus, a low surface energy, easily parted layer is presented to the wax or toners that pass through the nip. This low surface energy layer of release agent thereby prevents wax or toner from adhering to the fuser roll surface.

Numerous systems have been used to deliver wax or toner release agents to the fuser roll. These systems sometimes incorporate a textile as the release agent fluid holding and delivery medium. Such textiles also serve an additional role in that they are utilized as a fuser roller cleaning mechanism. With each rotation of the fuser roller, there may be some non-released wax or toner particles remaining on the surface of the fuser roller. These non-released wax or toner particles are captured in the interstices of the textile fibers used to deliver the release agents to the fuser roll.

Some of the release agent delivery textiles, which are more commonly used in printing machines, are known as non-woven textiles. Some of the more commonly used non-woven textiles are known as hydroentangled non-woven textiles, needle felts, thermal bonds, and spun bonds. Many of the non-woven textiles used in printing machines are typically made of fibers with some content of polyesters, nylons, amides, aramids, imides, polyphenylene sulfide (PPS), PTFE, and/or viscose rayons. The textiles are typically impregnated with a silicone oil such as those sold by the Dow Corning Corporation. Many of these silicone oil impregnated textiles are manufactured at BMP America Incorporated located in Medina, N.Y. or at BMP Europe Limited located in Accrington, Lancashire, United Kingdom.

Although these oil impregnated non-woven textiles meet a number of application requirements, many applications demand still higher oil holding capabilities with low oil leak rates. In an effort directed to providing a printer which is as small as feasible, and thus having an oil delivery system which is as small as possible, every step towards reducing the size of the oil delivery system is critical in today's market. Certain oil holding issues still exist with the presently used textile materials. Under many conditions, current textile materials leak oil when saturated to high levels. These oil leaks are very undesirable and can decrease print quality because they can form oil blotches. They can also decrease the expected oil delivery life of the textile roller.

Every step towards increasing an oil delivery roller's oil holding capacity is a step towards increased oil delivery life while at the same time not sacrificing print quality.

SUMMARY OF THE INVENTION

It is an object of the present invention to provide a release agent delivery system for use in a printer.

Another object of the present invention is to provide a non-woven textile fabric web roller useable as a release agent delivery device.

A further object of the present invention is to provide a non-woven textile fabric web roller of essentially sub-denier fibers useable as a release agent delivery device.

Still another object of the present invention is to provide a release agent delivery web roller which will increase the oil holding capacity of a given size textile fabric web oil delivery device.

Yet a further object of the present invention is to provide a release agent delivery web roller which will increase the oil holding capacity of a textile oil delivery device while maintaining a low to zero oil leaking rate under normal printer operating conditions.

In accordance with the present invention, a release agent is delivered to a fuser roller by the use of a roller that includes a roller shaft which has been wrapped with a multiplicity of layers of a non-woven textile web of essentially sub-denier fibers. These sub-denier fibers in the web which has been wound on the roller shaft provide much improved oil holding capacity. Instead of demonstrating substantial oil leaking at a given oil loading when placed into a simulated printer environment, the oil retention of the non-woven textile web which contains essentially sub-denier fibers in accordance with the present invention, and which is wound in multiple layers on a roller shaft, results in minimal to zero oil leakage when compared to prior devices subjected to identical oil loading when placed in identical simulated printer environments. This increased oil holding capacity provides for longer life textile oil delivery rollers within a given set of size and oil retention constraints.

The sub-denier fibers of the non-woven textile web used in the release agent delivery system of the present invention provide a textile with a high surface area per unit volume. A textile's surface area per unit volume has a strong influence on its capillary force. The high capillary force of the non-woven textile web of essentially sub-denier fibers, in accordance with the present invention, results in a web roller with a high capillary force. Such a web roller can be impregnated with a higher amount of oil before displaying any signs of leakage. Thus, the release agent delivery system of the present invention provides a non-leaking release agent delivery roller having a higher oil holding capacity than is provided by other current web rollers.

The textile fabric web consisting of essentially 100% sub-denier fibers also has a high void volume per unit volume. This high void volume results in a large capillary force for the same unit volume. Again the result is twofold. The non-woven textile web used in the release agent delivery system, particularly in the form of a web-wrapped roller, provides a large volume of oil holding capacity with a minimal or zero leak rate. These two desirable, but often essentially exclusive characteristics, are a function of the amount of sub-denier fibers used to form the non-woven textile used to construct the release agent application roller of the present invention.

The higher oil holding capacity of the non-woven textile web roller of the present invention allows for the less frequent replacement of the oil delivery system or allows for a smaller roller size to provide the same life as larger prior art rollers. Both of these properties are very critical in today's printer designs. Longer life consumable components and smaller consumable components are key design features in today's printer consumable parts.

To attain these objectives, the high capacity leak resistant release agent delivery system in accordance with the present invention utilizes, in one preferred embodiment, a textile web of substantially sub-denier fibers, with the web weighing in the range of 10 to 300 grams/square meter and being comprised of greater than 55% fibers which are sub-denier in size. The textile web may be produced by hydroentangling, thermal bonding, spun bonding, needle felting, melt blowing, or other non-woven technologies. The textile web is impregnated with a release agent, which is typically silicone oil, to a level of 2.5 to 500 grams/square meter. The textile web is wound in a plurality of layers on a roller core or shaft and results in a release agent delivery roller with greatly improved oil delivery and retention capabilities. The resultant release agent delivery system provides these greatly improved oil holding capabilities as a result of significantly increased textile capillary force. This increased capillary force is a function of the high surface area per unit volume and the high void volume of the textile web of substantially sub-denier fibers. The present invention is a substantial advance in the art.

BRIEF DESCRIPTION OF THE DRAWINGS

While the novel features of the release agent delivery system for printers in accordance with the present invention are set forth with particularity in the appended claims, a full and complete understanding of the present invention may be had by referring to the detailed description of the preferred embodiments, as presented subsequently, and as illustrated in the accompanying drawings in which:

DETAILED DESCRIPTION OF THE PREFERRED EMBODIMENT

Figure 1:
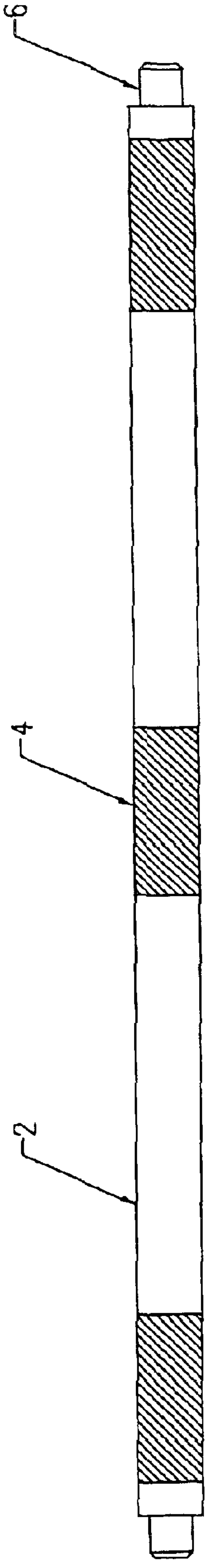
FIG. 1 is a side elevation view of a textile web support shaft, which is usable to support a textile web of a release agent delivery system in accordance with the present invention.

Referring initially to FIG. 1, there may be seen a roller shaft, generally at 2, upon which a textile web may be wound in a circumferential fashion. The roller shaft 2 is typically constructed of metal but could be produced from plastic or similar materials. The roller shaft 2 has attachment features 4 such as knurls or adhesives for use in the mechanical attachment of the textile web to the shaft 2. The roller shaft 2 typically has journals 6 on which the roller rotates when the roller is positioned in a printer's oil supply system housing which is not specifically shown.

Figure 2:
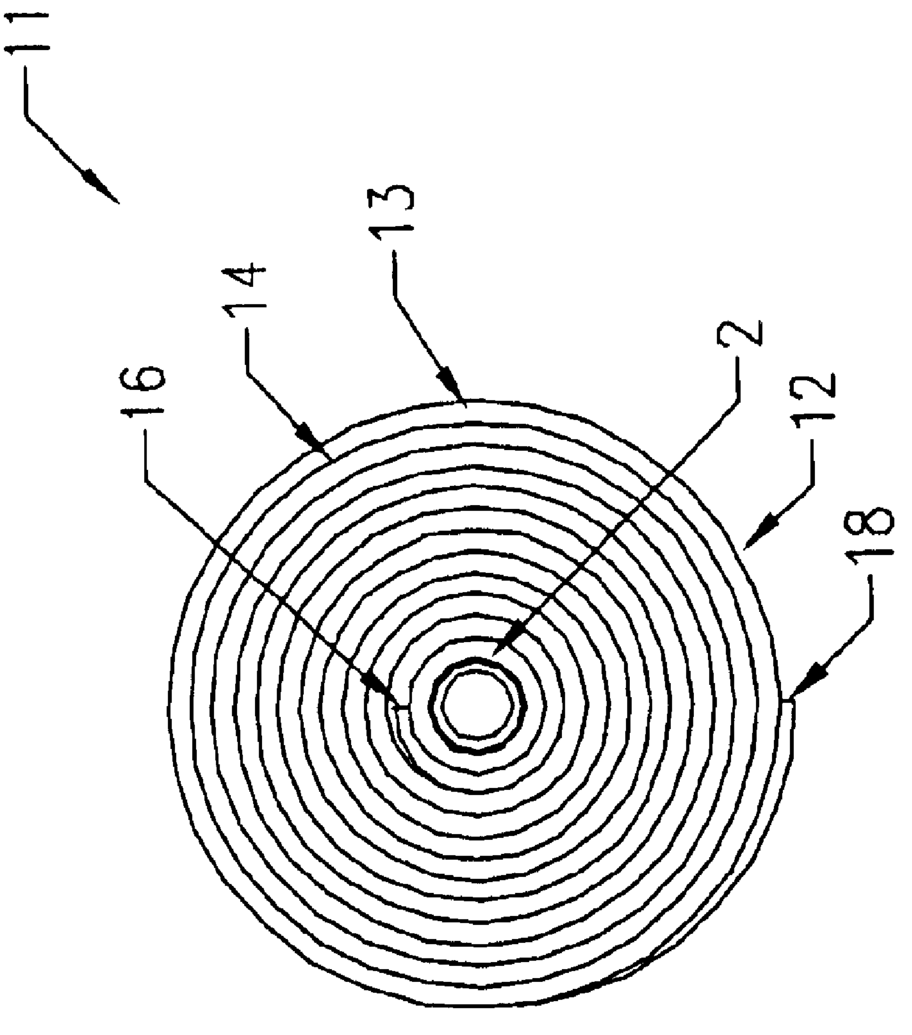
FIG. 2 is an end view of a wound textile release agent delivery device on a support shaft, in accordance with the present invention.

Referring to FIG. 2, there may be seen an end view of a wound textile release agent delivery device, generally at 11, in accordance with the present invention. A non-woven textile 12, which is comprised of substantially all sub-denier fibers, is wound on a roller shaft 2, generally of the type depicted in FIG. 1. An outer layer 13 of wound textile 12 that is wound on the roller shaft 2 forms a release agent delivery point when the wound textile release agent delivery device is in use. A second from last textile wrap 14 is the typical point of textile to textile final binding which provides the roller's "roll like" integrity. This textile final binding is typically a strip of adhesive, a non-continuous pattern of adhesive, a non-continuous pattern of ultrasonic staking, a non-continuous pattern of thermal binding, or some such non-continuous mechanical attachment of the outer layer 13 of the non-woven, substantially sub-denier textile 12 to the second from last layer 14 of textile 12. An initial wrap 16 of textile 12 around the roller shaft 2 is the point of textile 12 to shaft 2 binding which anchors the textile 12 to the shaft 2. This initial binding is typically an adhesive attachment or is accomplished by the use of metal knurls for a mechanical attachment. An end portion 18 of the last wrap 13 is typically bonded down to the top of the second from last textile wrap 14 with a strip of adhesive, a non-continuous pattern of adhesive, a non-continuous pattern of ultrasonic staking, a non-continuous pattern of thermal binding, or some such non-continuous mechanical attachment.

Figure 3:
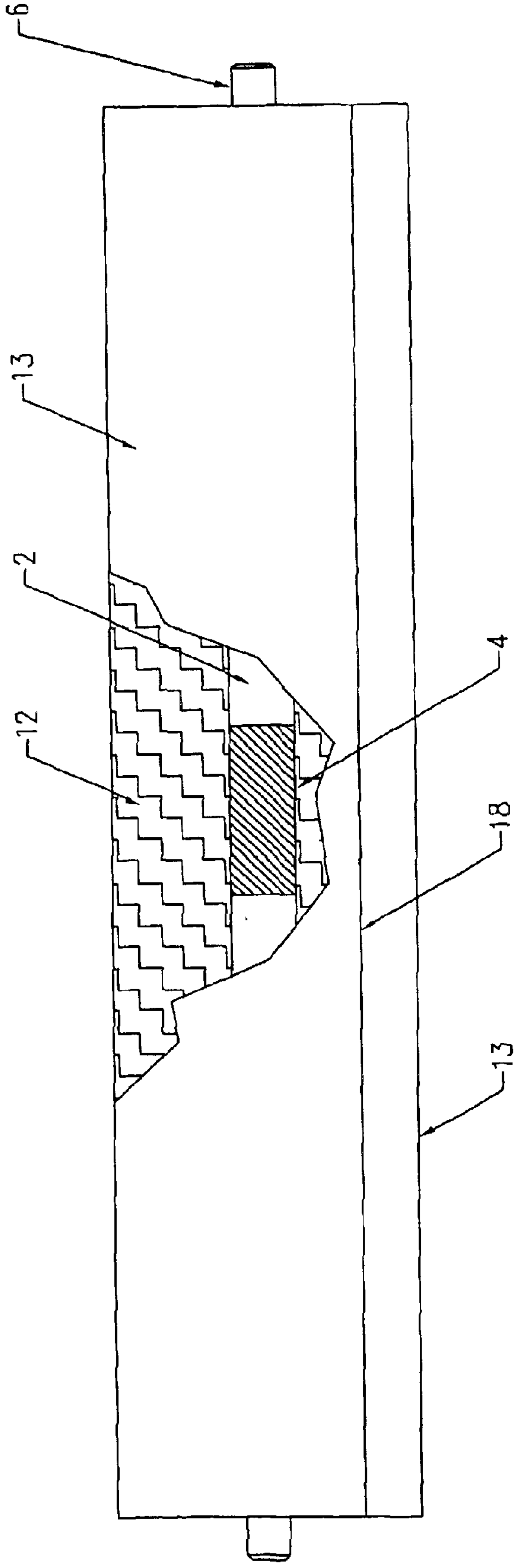
FIG. 3 is a side elevation view, partly in section, of a wound textile release agent delivery device on a support shaft, in accordance with the present invention.

As may be seen in FIGS. 2 and 3, the textile 12 is wound on the roller shaft 2. A plurality of layers of the textile web 12 are built up on the roller shaft 2. The number of layers of textile 12 is a function of the desired service life and of the space available in which to position the release agent delivery roller, generally at 11. The outermost layer 13 of the non-woven textile web 12 of substantially sub-denier fibers is the surface which transfers the release agent, such as a silicone oil, that is held in the textile web 12 wound into a roller shape, onto the surface of a fuser roller of an EP or PC printer device. The transfer of the release agent from the uppermost layer 13 of the textile web 12 acts to dry out that outermost layer. The release agent in the outermost layer 13 of the roller 11 is replenished by the tendency of the release agent that is retained in all of the layers 12 of the textile web wound on the roller shaft 2 to stay in equilibrium. This causes an essentially continuous migration of the release agent from the inner web layers to the outermost textile web layer 13. While this process of replenishment of the outer web layer 13 on the roller 11 due to the tendency of the release agent to attempt to maintain an equilibrium condition in all of the textile layers 12 wound on the web core 2 is not a part of the present invention, the use of the non-woven textile web of essentially sub-denier fibers in accordance with the present invention provides a release agent roller with far superior release agent retention capability and capacity. Accordingly, as the release agent is transferred to the fuser roller from the outermost layer 13 of the textile web 12, there is a large reservoir of release agent in the inner layers of the non-woven textile web 12 which will move to the outermost layer 13 in an effort to maintain an equilibrium condition throughout the entire roller.

FIG. 3 is a side elevation view, partly in section of a wound textile release agent delivery device in accordance with the present invention. The end portion 18 of the outer wrap 13 as seen in FIG. 3 is shown rotated from its location of FIG. 2. The internal body of the wound textile 12 contains release agent in the textile's interstices. The body of the textile 12 is mechanically supported by the shaft 2 and is attached by the adhesion/knurl points 4. The wound textile release agent delivery device rotates on journals 6 which are in a printer device. The wound textile release agent delivery device 11 exudes release agent to the printer through the device's outer most layer of textile 13.

Figure 4:
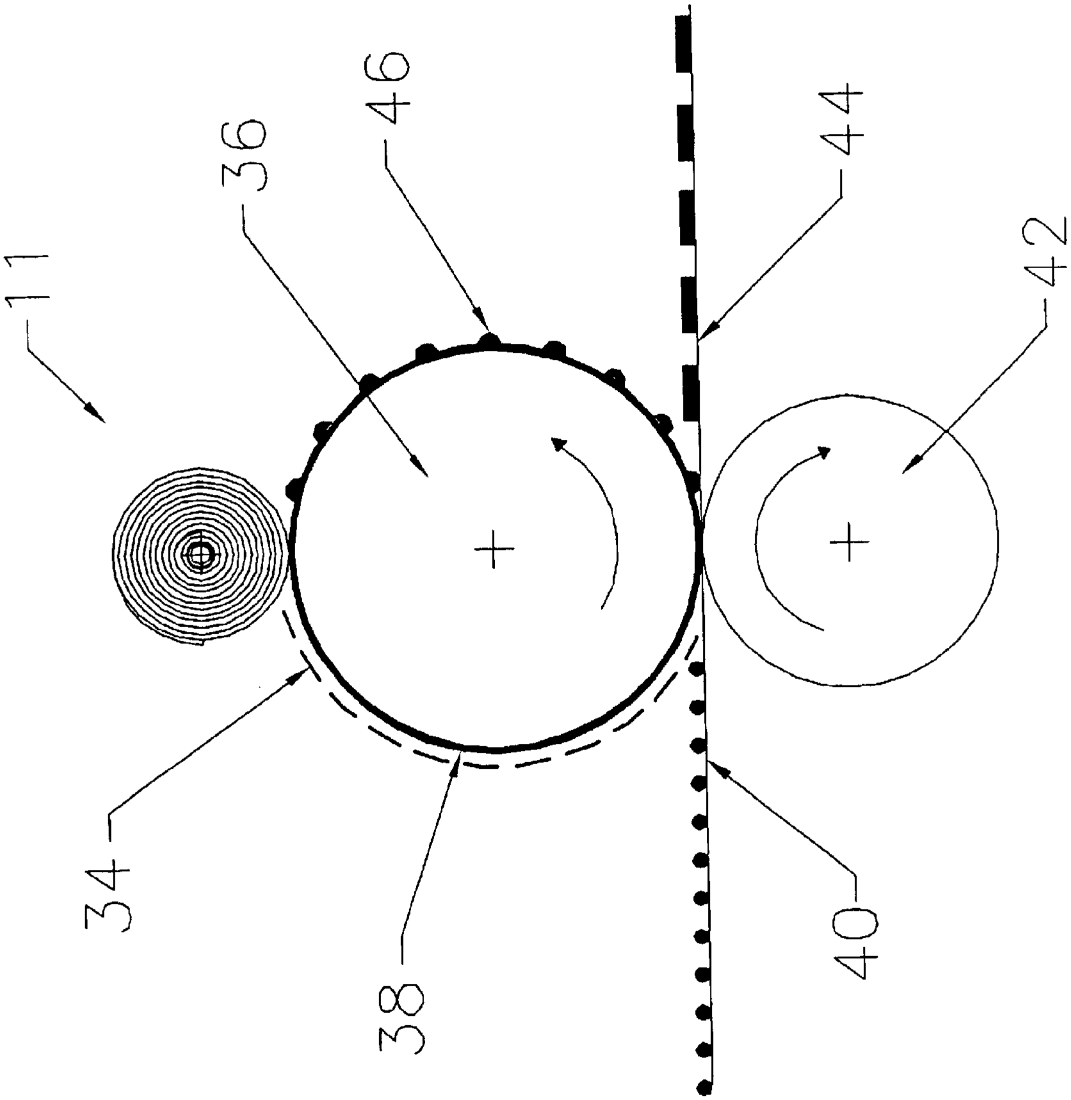
FIG. 4 is an end view of the release agent delivery device using a wound textile fabric for delivery of a release agent in an EP printer device in accordance with the present invention.

FIG. 4 is a side elevation view of the release agent delivery device 11 of the present invention and using a wound textile fabric 12 for delivery of a release agent in a EP printer device. The release agent delivery device 11 delivers a release agent 34 to a fuser roller 36 or more specifically to the fuser roller's surface 38. A substrate, typically paper, with electrostatically attached toner 40 enters a nip between the fuser roll 36 and a pressure roll 42. The substrate exits the nip with "fused" attached toner 44. On occasion, some fused toner 46 unintentionally resides on the fuser drum 36 but is then cleaned by the textile interstices of the release agent delivery device 11.

Figure 5:
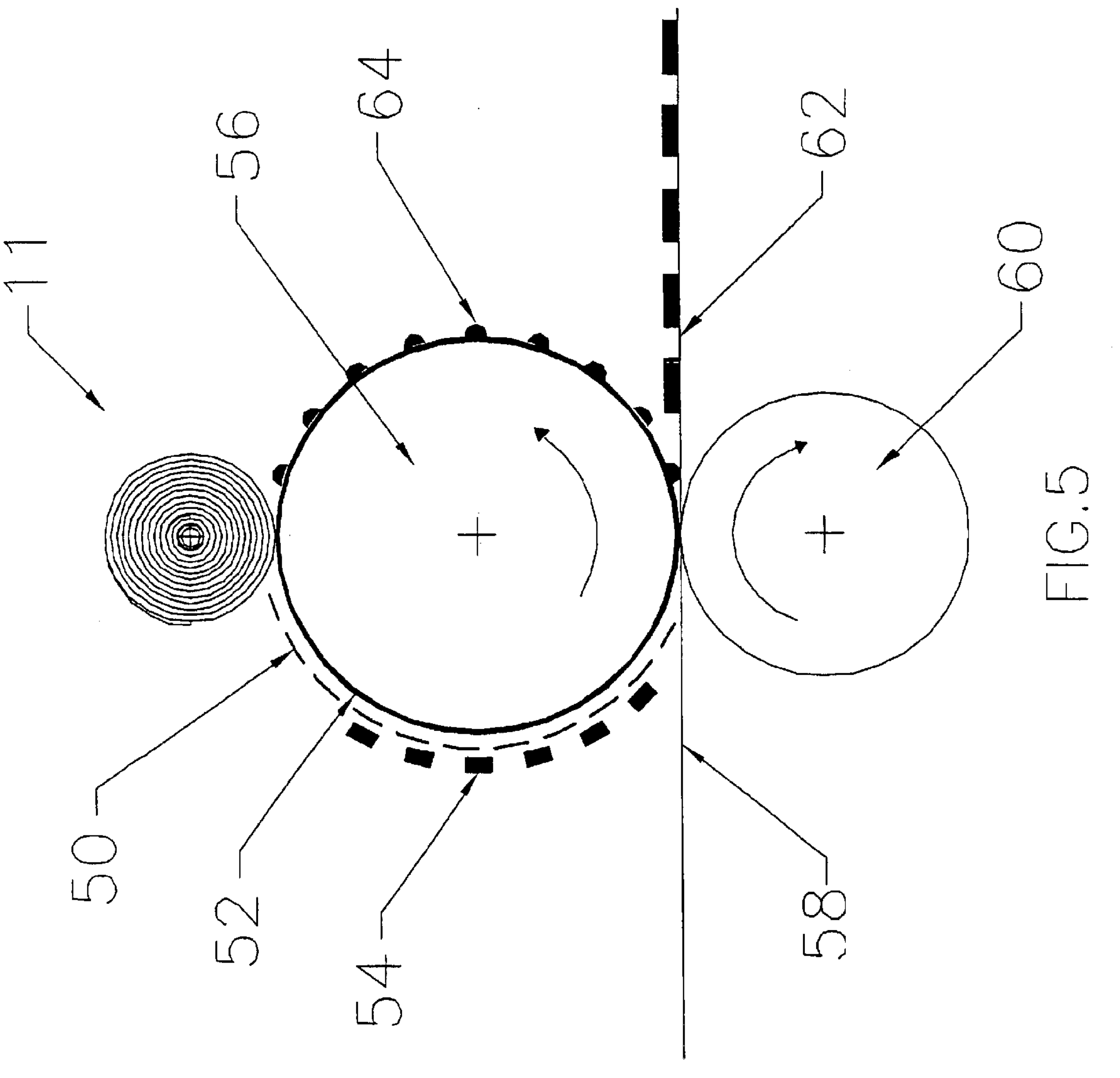
FIG. 5 is an end elevation view of a release agent delivery device using a wound textile fabric for delivery of a release agent in a PC printer device in accordance with the present invention.

FIG. 5 is a side elevation view of a release agent delivery device 11 using a wound textile fabric 12 for delivery of a release agent in a PC printer device in accordance with the present invention. The release agent delivery device 11 delivers release agent 50 to the fuser roller 56 or more specifically to the fuser roller's surface 52. The PC printer delivers a wax ink 54 on top of the release agent layer 50. A substrate, typically paper, 58 enters a nip between the fuser roller 56 and a pressure roll 60. The substrate exits the nip with attached wax ink 62. On occasion, some wax ink 64 unintentionally resides on the fuser drum 56 but is then cleaned by the textile interstices of the release agent delivery device 11 of the present invention.

In both types of printer devices, such as the EP of FIG. 4 and the PC of FIG. 5, the importance of the release agent delivery system 11 for metering a very precise amount of release agent per revolution is critical to print quality and to release agent delivery system life. The amount of release agent, 34 or 50, deposited upon the fuser roller 36, or 56, respectively can dramatically effect print quality. Typical targeted amounts of release agent deposited per page are 0.01 mg/page (0.00001 g/page) to 10.00 mg/page (0.01 g/page). Very minor fluctuations in amount can dramatically affect the printer's intended release characteristics and print quality. Too little release agent, 34 or 50, will inhibit the intended release of fused toner 46 or wax 64 onto the substrate surface 44 or 62. In most of these printer styles, the release agent amount affects the printed images appearance. High oil yields a glossy finish appearance while low oil yields a matte finish appearance. Too little oil can lead to an undesired matte finish while too much oil can lead to an undesired glossy finish and to an oil soaked page.

The capillary force of the textile used for the release agent delivery system is a very critical driving force in the release agent delivery system's 11 metering rate and holding capacity. The metering rate or the printer's intended target release agent rate per page can be changed by changing one or more of many variables such as the delivery system's textile capillary force, the delivery system's force of compression against the fuser roller, the delivery system's speed relative to the fuser roller, the release agent's viscosity and surface tension, and the fuser roller temperature which ranges typically between 20° and 260° C., and more specifically typically between 30° to 90° C. for wax ink fuser rollers and 160° to 240° C. for toner fusers rollers. The holding capacity of the release agent delivery system does not have as many available variables in the metering rate requirement. The holding capacity of the release agent delivery system is a delicate balance of textile capillary force, textile void volume, release agent viscosity, and release agent surface tension. The release agent characteristics are typically selected based primarily on the required release characteristics of the toner and of the ink or the wax with little regard to the holding capacity of the release agent delivery system. This is understandable since the major function of the release agent is to release the toner 46 and the ink wax 64. This being the case, selection of the release agent delivery device has to be made so as to optimize release agent holding capacity by maximizing the textile's capillary force while maintaining void volume. Capillary force is a very strong function of surface area per unit volume. The release agent delivery system of the present invention maximizes surface area per unit volume by incorporating at least 55% microdenier fibers and preferably by incorporating 100% microdenier fibers in the textile web. These are fibers whose linear density is less than 1 gram weight/9000 meters of length. More specifically, the present invention's best results come from incorporating the most fine polymer fibers which are commercially available in a form suitable to produce the required textile styles. These fine fibers are known as "splitable" fibers and are available in linear densities as low as 0.05 grams per 9000 linear meters.

Suitable textile styles for use in forming the release agent delivery system in accordance with the present invention are non-woven textile that can be produced using various processing methodologies such as hydroentangleing, spun bonding, thermal bonding, and needlefelting. Most specifically, best results have been attained using a product which is a combination spunbond/hydroentagled product which incorporates splitable fibers. Such manufacturing processes are known to those skilled in the art. The fibers of these textiles preferably are nylon, amide, imide, polyester, aramid, PTFE, PPS, viscose rayon, or a blend of these fibers or a composite of these chemistries in a fiber that is then splitable to ultra fine deniers. A splitable fiber is a composite fiber such as polyester and nylon which, when processed, splits into much finer fibers. Splitable fibers are well known to those skilled in the art. The linear density of these fibers ranges between 0.05 denier and 3 denier, and preferably between 0.05 denier and 0.35 denier. These sub-denier fibers are used to produce the non-woven textile webs which as useable to form the release agent delivery system of the present invention. The resultant textiles' area weight is typically between 30 and 450 grams per square meter (gsm), and preferably ranges from 60 to 200 gsm. The textiles' thickness is typically between 0.050 mm and 1.000 mm. The preferred textile thickness ranges from 0.150 mm to 0.500 mm.

The non-woven textile webs are first formed using the processing technologies discussed above. Once they are formed, the textile webs are then slit into a size suitable for supplying oil to a fuser apparatus in an EP or PC printing machine. These sizes range from 0.150 meters wide by 0.5 meter long to 1.1 meters wide by 200 meters long. The next step is typically one of impregnating the resultant non-woven textile web with a fuser release fluid such as a silicone oil. Most commonly, silicone oil with a viscosity within the range of 5 to 100,000 centistoke is utilized as the fuser release fluid.

As discussed above, the utilization of a non-woven textile web of substantially sub-denier fibers in a roller of a toner release agent device in accordance with the present invention facilitates the production of an EP or a PC printer toner release agent device with increased oil holding capacity through increased textile capillary force which is a result of the textile web's inherent higher surface area to volume ratio. This increased oil holding capacity will increase the oil leak resistance of a toner or wax release agent device. This increased oil leak resistance accomplishes the storage of more oil in the textile web based release agent delivery device without oil leakage concerns which, in turn, yields longer life due to higher oil holding capacity.

EXAMPLE 1

A spun bond hydroentangled textile was manufactured using nylon/polyester composite splitable fibers. The resultant textile web contained a majority of split fibers of approximately 0.14 denier. These ultra fine split fibers yield a very high capillary force textile web. A suitable textile web is manufactured by the Freudenberg Nonwovens company under the name of "Evolon" fabric. Additionally advantageous of "Evolon" is the fact that it is a continuous filament textile which leads to very good fiber retention. Loose fibers are a very negative occurrence in virtually all printer textile applications.

The spun-bond hydroentagled textile web was manufactured to an area weight of 130 grams/square meter with a thickness of 0.59 mm. The material was then slit to a width of 210 mm. The web was then wound onto a metal shaft to a length of 3.1 meters, forming a web-wrapped roller with a roller outer diameter of 1.75". The outer wrap was then adhered to the second from outer wrap using a liquid adhesive. The adhesive was allowed to dry. The dry web wrapped roll was then impregnated with various amounts of oil. The amounts of oil impregnation included 150 grams, 175 grams, 200 grams, 225 grams, and 250 grams. Oil of 50 Centistoke silicone oil as manufactured by Dow Corning under the brand name 200 fluid, was used.

To determine the oil holding capacity of the web wrapped roller, one common methodology is known as leak testing. The leak test procedure used for the web in accordance with example 1, and in accordance the following examples #2, #3, and #4, is as follows:

a) Preset a laboratory oven (VWR model 1630) to 60 degrees Celsius and allow oven temperature to stabilize.
b) Individually mount rollers vertically in a metal plate fixture which supports the web roll by holding the bottom most portion of the shaft without touching any portion of the web. Each metal plate fixture should be placed on an individual oil collection pan. Both fixture and pan should be pre-weighed.
c) Heat rollers at 60 degrees Celsius for 24 hours while mounted vertically.
d) Remove rollers with fixture and pan from oven.
e) Remove roller from fixture and pan. Weigh roller and then weigh fixture and pan.
f) The difference between the initial fixture and pan weight and the final fixture and pan weight is equal to the weight of the oil that leaked out of the roller.

COMPARATIVE EXAMPLE 2

The process used to determine the oil leaking by the web of example 1 was followed with a change of the textile used in comparative example 2. The comparative example 2 textile was a needle felt textile manufactured using 80% sub-denier fiber. This textile was manufactured using 20% 2.0 denier polyester fibers and 80% 0.7 denier polyester fibers, a web formulation typically used in prior art release agent delivery systems. The web was manufactured to an area weight of 500 grams/square meter with a thickness of 1.500 mm. The material was then slit to a width of 210 mm. The web was then wound onto a metal shaft to a length of 10.65 meters, forming a web wrapped roll with an outer diameter of 1.75".

COMPARATIVE EXAMPLE 3

The process used to determine the oil leaking by the web of example 1 was followed with a change of the textile used in comparative example 3. The comparative example 3 textile was a hydroentangled textile manufactured using 100% 1.35 denier polyester fiber. The web was manufactured to an area weight of 110 grams/square meter with a thickness of 0.70 mm. The material was then slit to a width of 210 mm. The web was then wound onto a metal shaft to a length of 3.46 meters, forming a web wrapped roll with an outer diameter of 1.75".

COMPARATIVE EXAMPLE 4

The process used to determine the oil leaking by the web of example 1 was followed with a change of the textile used in comparative example 4. The comparative example 4 textile was a needle felt textile manufactured using no sub-denier fiber. This textile was manufactured using 100% 1.5 denier polyester fibers, a web formulation typically used in prior art release agent delivery systems. The web was manufactured to an area weight of 235 grams/square meter with a thickness of 1.00 mm. The material was then slit to a width of 210 mm. The web was then wound onto a metal shaft to a length of 1.65 meters, forming a web wrapped roller with an outer diameter.

Results

Figure 6:
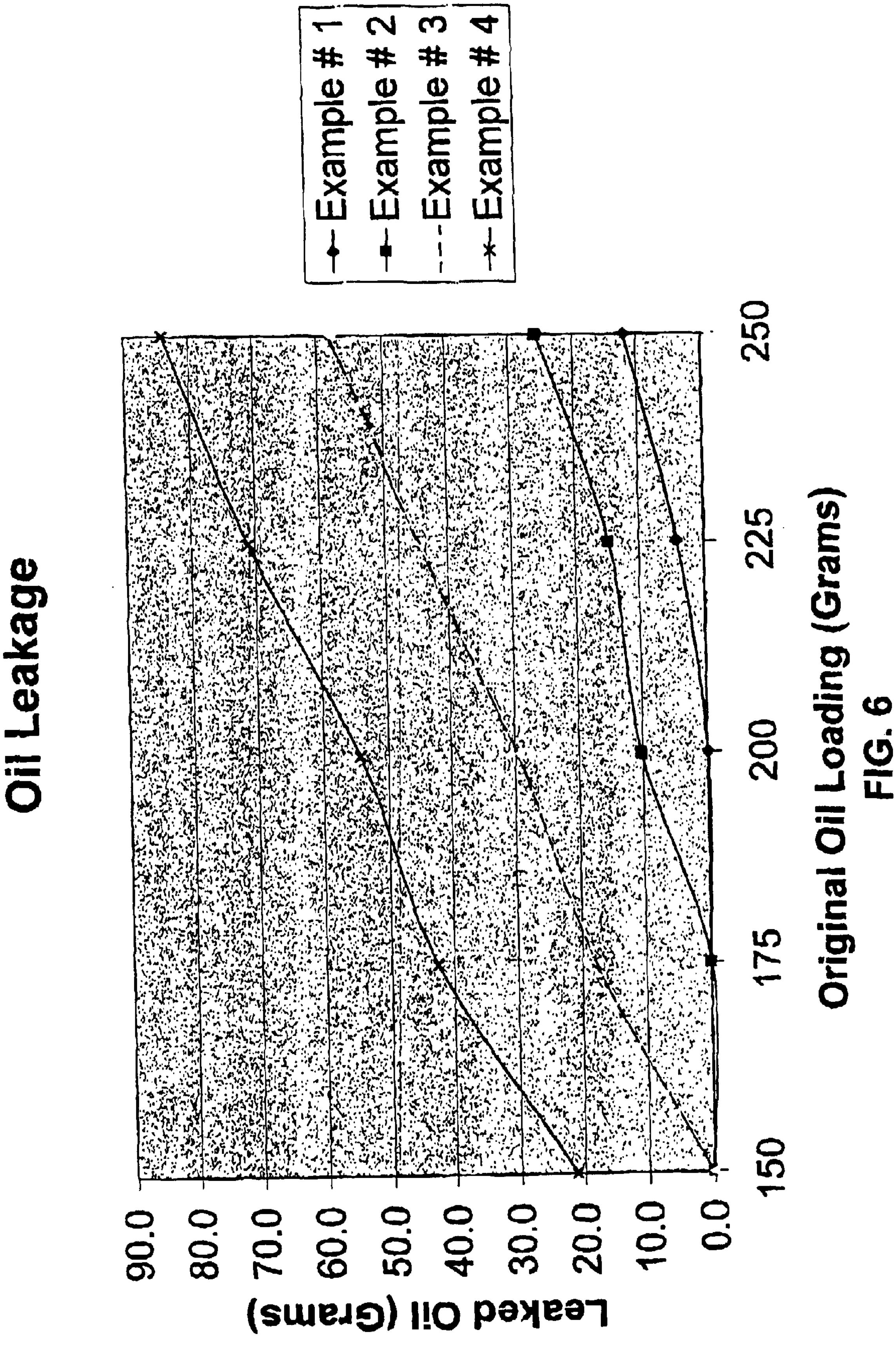
FIG. 6 is a graph of oil leakages of the release agent delivery system of the present invention in comparison to prior devices.

FIG. 6 is a graph which displays the superior release agent holding capability of a release agent delivery system in accordance with the present invention. Example #1 shows no oil leakage up to 200 grams loading while all other textiles showed a high degree of leakage at the same 200 gram loading. The capability of a textile web with a higher surface area per unit volume to provide higher capillary force and thus to provide improved oil retention is also clearly indicated when viewing the results versus the calculated surface area per unit of web roller volume. The following table displays this clear trend of improved oil retention with increased surface area per unit volume; i.e. with decreased fiber size.

| | Fiber Type | Fiber Denier (d) | Fiber Density (g/cc) | Web Length (Meters) | Web Width (mm) | Web Area (M^2) | Area Weight (g/M^2) | Surface Area (cm^2) | Oil Leakage @ 200 g |
|---|---|---|---|---|---|---|---|---|---|
| Example #1 | Polyester & Nylon | 0.14 | Approx 1.35 | 3.10 | 210 | 0.651 | 130 | 647,641 | 0.0 |
| Example #2 | Polyester | 0.7/2.0 | 1.38 | 0.81 | 210 | 0.170 | 500 | 267,297 | 10.2 |
| Example #3 | Polyester | 1.35 | 1.38 | 3.46 | 210 | 0.726 | 110 | 194,952 | 29.4 |
| Example #4 | Polyester | 1.5 | 1.38 | 1.65 | 210 | 0.347 | 235 | 134,612 | 54.3 |

The splitable fiber non-woven textile webs, which contain fibers with deniers as low as 0.05 d, and which are identified as example #1, are the preferred textiles for use with the present invention. No other textile that is fit for the purpose of an EP or PC printer web wrap roller, has achieved the oil retention levels obtained by the release agent delivery system of the present invention.

It will be thus seen that the release agent delivery system, using a non-woven web of substantially sub-denier fibers, in accordance with the present invention, results in the production of a more leak resistant web roller release agent delivery system.

While a preferred embodiment of a release agent delivery system for EP and PC printers in accordance with the present invention has been set forth fully and completely hereinabove, it will be apparent to one of skill in the art that a number of changes in, for example the specific printer being used, the non-woven processing method being used, and the like could be made without departing from the true spirit and scope of the present invention which is accordingly to be limited only by the following claims.

What is claimed is:

1. A toner release agent application roller comprising:

a roller shaft;

a textile web wound in a plurality of layers on said roller shaft, said textile web being formed of greater than 55% sub-denier fibers, said layers including an outer layer defining an outer surface of said roller, said outer surface being directly engageable with a surface of a fuser roller, said textile web having a high void volume per unit volume and a high surface area per unit volume and a high capillary force;

means securing an end of said outer layer to a second, underlying layer of said plurality of layers of said textile web; and a release agent impregnated in said textile web to a level of between 2.5 and 500 grams/square meter, said release agent being impartable to the fuser roller during said contact of said outer surface of said roller formed by said outer layer of said plurality of layers of said textile web, wound on said roller shaft, with the fuser roller, said high capillary force providing a high release agent retention capacity for said roller.

2. The toner release agent application roller of claim 1 wherein said textile web includes a majority of splitable fibers.

3. The toner release agent application roller of claim 2 wherein splitable fibers are ultra-fine.

4. The toner release agent application roller of claim 3 wherein said ultra-fine fibers are between 0.05 denier and 0.35 denier.

5. The toner release agent application roller of claim 4 wherein at least 80% of said ultra-fine fibers are below 0.35 denier.

6. The toner release agent application roller of claim 2 wherein said splitable fibers have a linear density of no greater than 1 gram weight per 9000 meters of length.

7. The toner release agent application roller of claim 1 wherein said textile web is formed of 100% sub-denier fibers.

8. The toner release agent application roller of claim 1 wherein said textile web is a non-woven textile web.

9. The toner release agent application roller of claim 8 wherein said non-woven textile web is a spunbond/hydroentangled non-woven textile web.

10. The toner release agent application roller of claim 1 wherein said textile web has an area weight of between 30 and 450 grams per square meter.

11. The toner release agent application roller 1 wherein said release agent includes silicone oil.

12. The toner release agent application roller of claim 1 of claim 11 wherein said silicone oil has a viscosity between 10 and 100,000 centistoke.

* * * * *